(12) United States Patent
Skertic et al.

(10) Patent No.: US 11,057,240 B2
(45) Date of Patent: Jul. 6, 2021

(54) METHOD AND PROCESS FOR SECURING AN EXECUTABLE IMAGE

(71) Applicants: Rolls-Royce North American Technologies Inc., Indianapolis, IN (US); Rolls-Royce Corporation, Indianapolis, IN (US)

(72) Inventors: Richard Joseph Skertic, Carmel, IN (US); John Joseph Costello, Indianapolis, IN (US)

(73) Assignees: ROLLS-ROYCE NORTH AMERICAN TECHNOLOGIES INC., Indianapolis, IN (US); ROLLS-ROYCE CORPORATION, Indianapolis, IN (US)

( * ) Notice: Subject to any disclaimer, the term of this patent is extended or adjusted under 35 U.S.C. 154(b) by 30 days.

(21) Appl. No.: 16/283,644

(22) Filed: Feb. 22, 2019

(65) Prior Publication Data

US 2020/0201779 A1 Jun. 25, 2020

Related U.S. Application Data

(60) Provisional application No. 62/782,984, filed on Dec. 20, 2018, provisional application No. 62/785,601, (Continued)

(51) Int. Cl.
*G06F 12/1018* (2016.01)
*G06F 21/12* (2013.01)
(Continued)

(52) U.S. Cl.
CPC ............ *H04L 12/437* (2013.01); *B64D 31/06* (2013.01); *F02C 7/26* (2013.01); *G05B 19/0425* (2013.01);
(Continued)

(58) Field of Classification Search
CPC ... H04L 9/3242; H04L 9/0643; H04L 9/3239; H04L 9/3263; H04L 9/0825;
(Continued)

(56) References Cited

U.S. PATENT DOCUMENTS 8,443,183 B2 5/2013 Lin et al.
8,788,839 B1 7/2014 Dong et al.
(Continued)

OTHER PUBLICATIONS

D. Vujičić, D. Jagodić and S. Randić, "Blockchain technology, bitcoin, and Ethereum: A brief overview," 2018 17th International Symposium Infoteh-Jahorina (INFOTEH), East Sarajevo, Apr. 2018. (Year: 2018).*

*Primary Examiner* — Ramon A. Mercado
(74) *Attorney, Agent, or Firm* — Brinks Gilson & Lione

(57) ABSTRACT

Control systems and methods for securely loading software in a power control system. In some examples, the control system includes a computing device and a plurality of security modules. The computing device may obtain and divide an executable image into a plurality of images. The computing device may generate a control hash as a function of the plurality of images, and record the control hash. The computing device may store each of the plurality of images in a plurality of security modules. At boot up, the computing device may load, from each security module, the stored image, and store each image to a memory device. The computing device may generate a hash based on the stored images, and compare the generated hash to the recorded control hash. Based on the comparison, the computing device may allow execution of the executable image.

15 Claims, 6 Drawing Sheets

Related U.S. Application Data filed on Dec. 27, 2018, provisional application No. 62/783,017, filed on Dec. 20, 2018.

(51) Int. Cl.
| | | |
|---|---|---|
| *G06F 16/182* | (2019.01) | |
| *G06F 21/57* | (2013.01) | |
| *H04L 9/06* | (2006.01) | |
| *H04L 12/437* | (2006.01) | |
| *G05B 19/042* | (2006.01) | |
| *H04L 9/00* | (2006.01) | |
| *G06F 16/23* | (2019.01) | |
| *B64D 31/06* | (2006.01) | |
| *F02C 7/26* | (2006.01) | |
| *H04L 9/32* | (2006.01) | |
| *H04L 9/08* | (2006.01) | |
| *H04L 29/06* | (2006.01) | |

(52) U.S. Cl.
CPC ........ *G06F 12/1018* (2013.01); *G06F 16/182* (2019.01); *G06F 16/2379* (2019.01); *G06F 21/125* (2013.01); *G06F 21/575* (2013.01); *H04L 9/006* (2013.01); *H04L 9/0618* (2013.01); *H04L 9/0637* (2013.01); *H04L 9/0643* (2013.01); *H04L 9/0825* (2013.01); *H04L 9/3242* (2013.01); *H04L 9/3263* (2013.01); *H04L 63/0435* (2013.01); *H04L 63/062* (2013.01); *H04L 63/0823* (2013.01); *H04L 63/123* (2013.01); *H04L 2209/38* (2013.01); *H04L 2463/062* (2013.01)

(58) Field of Classification Search
CPC . H04L 9/0637; H04L 63/0435; H04L 63/062; H04L 63/0823; G06F 12/1018; G06F 21/575

See application file for complete search history.

(56) References Cited

U.S. PATENT DOCUMENTS

| | | | |
|---|---|---|---|
| 9,407,437 B1* | 8/2016 | Campagna | H04L 9/0637 |
| 9,733,950 B2 | 8/2017 | Samuel et al. | |
| 10,013,573 B2* | 7/2018 | Dillenberger | H04L 9/3236 |
| 10,114,969 B1* | 10/2018 | Chaney | H04L 9/3247 |
| 2005/0257073 A1* | 11/2005 | Bade | G06F 21/575 |
| | | | 713/193 |
| 2009/0138727 A1 | 5/2009 | Campello De Souza | |
| 2012/0210115 A1* | 8/2012 | Park | H04L 9/3247 |
| | | | 713/2 |
| 2016/0226657 A1* | 8/2016 | Thom | H04L 9/003 |
| 2017/0243011 A1* | 8/2017 | Tschache | G06F 21/71 |
| 2017/0243012 A1* | 8/2017 | Karame | H04W 12/001 |
| 2018/0025181 A1* | 1/2018 | Barinov | G06F 21/645 |
| | | | 726/26 |
| 2018/0191502 A1* | 7/2018 | Karame | H04L 9/0825 |
| 2018/0219671 A1* | 8/2018 | Velissarios | H04L 63/08 |

* cited by examiner

METHOD AND PROCESS FOR SECURING AN EXECUTABLE IMAGE

CROSS-REFERENCE TO RELATED APPLICATIONS

This application claims priority to U.S. Provisional Application No. 62/782,984, filed Dec. 20, 2018, title: SECURE ENGINE COMMUNICATION; U.S. Provisional Application No. 62/785,601, filed Dec. 27, 2018, title: A METHOD AND PROCESS FOR BLOCKCHAIN IMPLEMENTATION WITH THIRD PARTY DEVICES; U.S. Provisional Application No. 62/783,017, filed Dec. 20, 2018, title: BLOCKCHAIN BASED VEHICLE CONTROL; and is related to co-pending U.S. application Ser. No. 16/283,643, filed Feb. 22, 2019, title: APPARATUS AND METHODS FOR AUTHENTICATING CYBER SECURE CONTROL SYSTEM CONFIGURATIONS USING DISTRIBUTED LEDGERS. The entirety of these applications are herein incorporated by reference.

BACKGROUND

Aircrafts, such as commercial and military aircraft, include aerospace control systems that control and monitor aircraft engines. The aerospace control systems may control and/or monitor aerospace control system components such as, for example, aircraft engine pressure sensors, temperature sensors, solenoids, and actuators. The aerospace control systems may also control and/or manage other aircraft engine parts and/or functionality. For example, aerospace control systems may assist in ensuring optimum aircraft engine efficiencies during flight are achieved by receiving various flight condition information and controlling various aircraft engine operations, such as fuel flow, valve positions, and others.

The aerospace control systems may include one or more controllers, such as an electronic engine controller ("EEC") or engine control unit ("ECU"), each of which may employ one or more computing devices to carry out its functions. The computing device may be a processor or a microprocessor, for example. Some aerospace control systems may include a full authority digital engine controller ("FADEC") that includes an EEC or an ECU, and may further include a central processing unit ("CPU"), memory, and a data bus to communicate with other aircraft engine components, such as aircraft engine sensors and actuators.

When the computing devices are powered on, they typically execute a bootstrapping or boot loading process to begin program execution. For example, upon power-up, a processor may execute a Basic Input/Output System (BIOS) from non-volatile memory that may perform hardware checks and register initializations. The BIOS may then cause the processor to retrieve a kernel from non-volatile memory and begin execution of the kernel. Execution of the kernel may cause the processor to, for example, initialize system memory (e.g., Random Access Memory (RAM)), retrieve from non-volatile memory a software image, such as an Operating System (OS) or Application, store the software image in system memory, and execute the software image.

These aerospace architectures, however, have vulnerabilities during this startup process, such as in a cyber-hostile environment. For example, unauthorized access to non-volatile memory where the software image is stored may allow the unauthorized modification of the software image. In some examples, threats from a cyber-attack may come from software loaded onto FADEC memory via one of the FADEC's maintenance or communication ports, for example. The loaded software may override otherwise authorized software, such as an OS or Application. As such, there are opportunities to address these and other vulnerabilities with aerospace control systems.

SUMMARY

The disclosure presents a method for securely loading software in a power control system. The method includes: dividing the software into at least a first image and a second image; generating a control hash as a function of the first image and the second image; recording the control hash; storing each of the respective first and second images in a first security module and a second security module; loading a first stored image from the first security modules in to a random access memory (RAM) of the power control system; generating a first hash of the first stored image; loading a second stored image from the second security modules into the RAM of the power control system; generating a second hash of the second stored image; comparing the second hash to the control hash; and flagging the second stored image based upon the comparison.

Either the first security module or the second security module may be a hardware security module. Either the first security module or the second security module may be a trusted protection module. According to some embodiments the second hash may be a function of the second stored image and the first hash of the first stored image. Generation of a control hash may include: generating a first control hash as a function of the first image; and generating a second control hash as a function of the second image; Generation of the first hash further may include comparing the first hash with the first control hash and flagging the loaded first stored image based upon the comparison. The generation of a control hash further may include encrypting the control hash. The comparison of the second hash to the control hash may include decrypting the encrypted control hash. In some embodiments the control hash may be recorded in a distributed ledger. In other embodiments the first and second control hashes may be stored in a distributed ledger. According to some embodiments the comparison of the second hash to the control hash may include encrypting the second hash. In some embodiments a software size of the software may be greater than a memory size of the first security module. In some embodiments the software may be an operating system or application. In some embodiments the dividing step may include downloading from the power control system's RAM sequential images representing the software and clearing the RAM.

Also presented is a method for securely loading software into secured memory via multiple security modules, which may include: dividing the software into n images; generating n control hashes, each control hash may be a function of the $n^{th}$ image and the n−1 image; recording each of the n control hashes; storing each of the n images in a corresponding n security modules; loading a corresponding image of the n images from an $i^{th}$ security module of the n security modules into the secured memory, where i is less than or equal to n; generating an $i^{th}$ hash of the stored image in the $i^{th}$ security module; comparing the $i^{th}$ hash to the corresponding $i^{th}$ one of the corresponding n control hashes; and executing the loaded software from the secured memory based upon the comparison.

In some embodiments the $i^{th}$ stored image may be the $n^{th}$ stored image. In other embodiments the n control hashes may be recorded in a distributed ledger. In yet other embodiments the dividing step may include downloading, from a random access memory (RAM), sequential images representing the software and clearing the RAM.

Also presented is a non-transitory, computer-readable storage medium that may include executable instructions that, when executed by one or more processors, cause the one or more processors to: divide a software image into n images; generate n control hashes, each control hash may be a function of the $n^{th}$ image and the n−1 image; record each of the n control hashes; store each of the n images in a corresponding n security modules; load the corresponding image of the n images from an $i^{th}$ security module of the n security modules into the secured memory, where i may be less than or equal to n; generate an $i^{th}$ hash of the stored image in the $i^{th}$ security module; compare the $i^{th}$ hash to the corresponding $i^{th}$ one of the corresponding n control hashes; and execute the loaded software from the secured memory based upon the comparison.

In some embodiments the executable instructions, when executed by the one or more processors, may cause the one or more processors to: download, from a random access memory (RAM), sequential images representing the software image; and clear the RAM. In other embodiments the executable instructions, when executed by the one or more processors, may cause the one or more processors to record the n control hashes in a distributed ledger.

BRIEF DESCRIPTION OF THE DRAWINGS

The following will be apparent from elements of the figures, which are provided for illustrative purposes.

DETAILED DESCRIPTION

Figure 1:
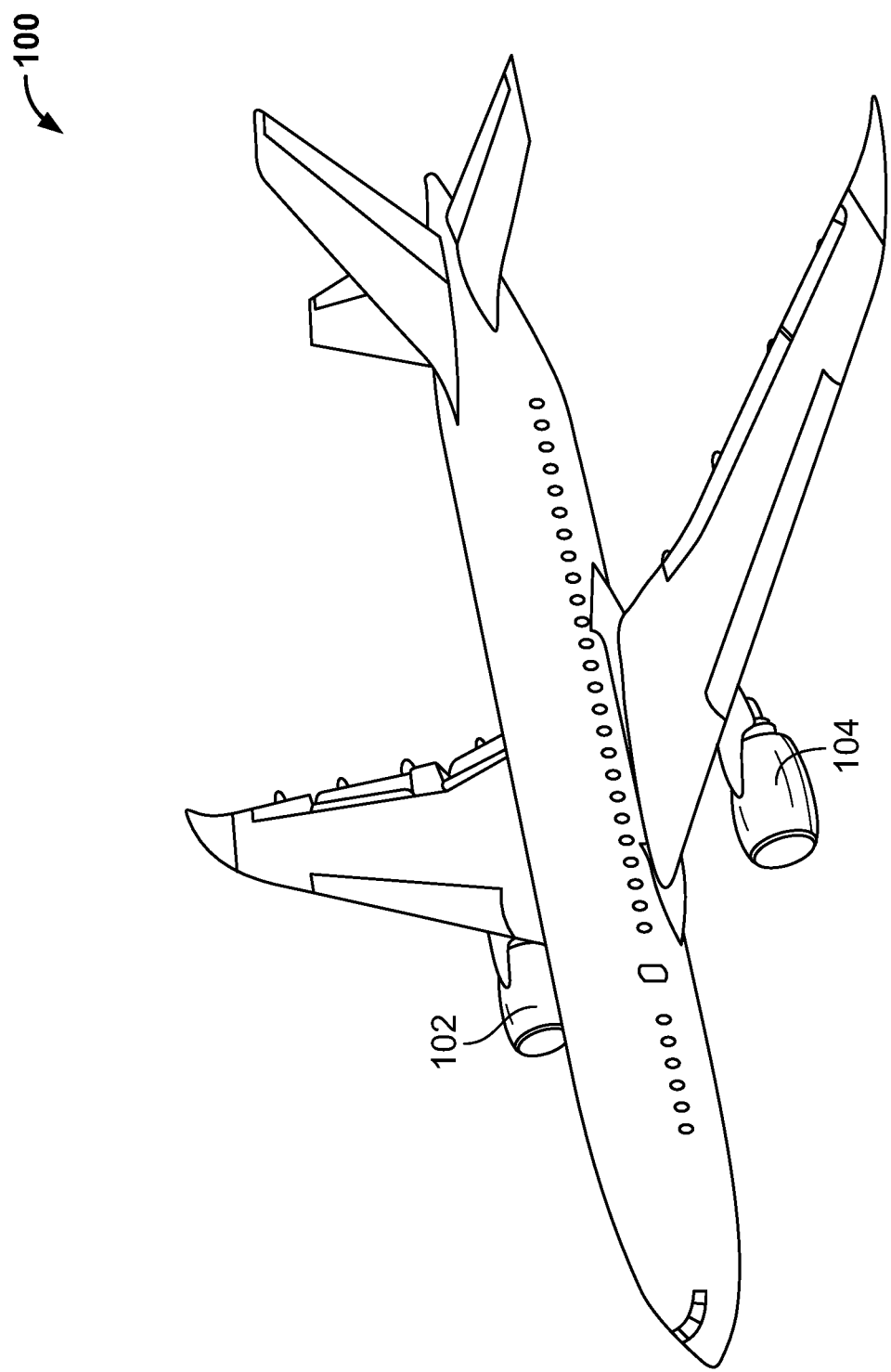
FIG. 1 is an illustration of an aircraft with engines employing an engine control system in accordance with some embodiments.

For the purposes of promoting an understanding of the principles of the disclosure, reference will now be made to a number of illustrative embodiments in the drawings and specific language will be used to describe the same. While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

FIG. 1 illustrates an example aircraft 100 with turbine engines 102, 104. Each turbine engine may be controlled by an engine control system, which is discussed in more detail with respect to FIG. 2.

Figure 2:
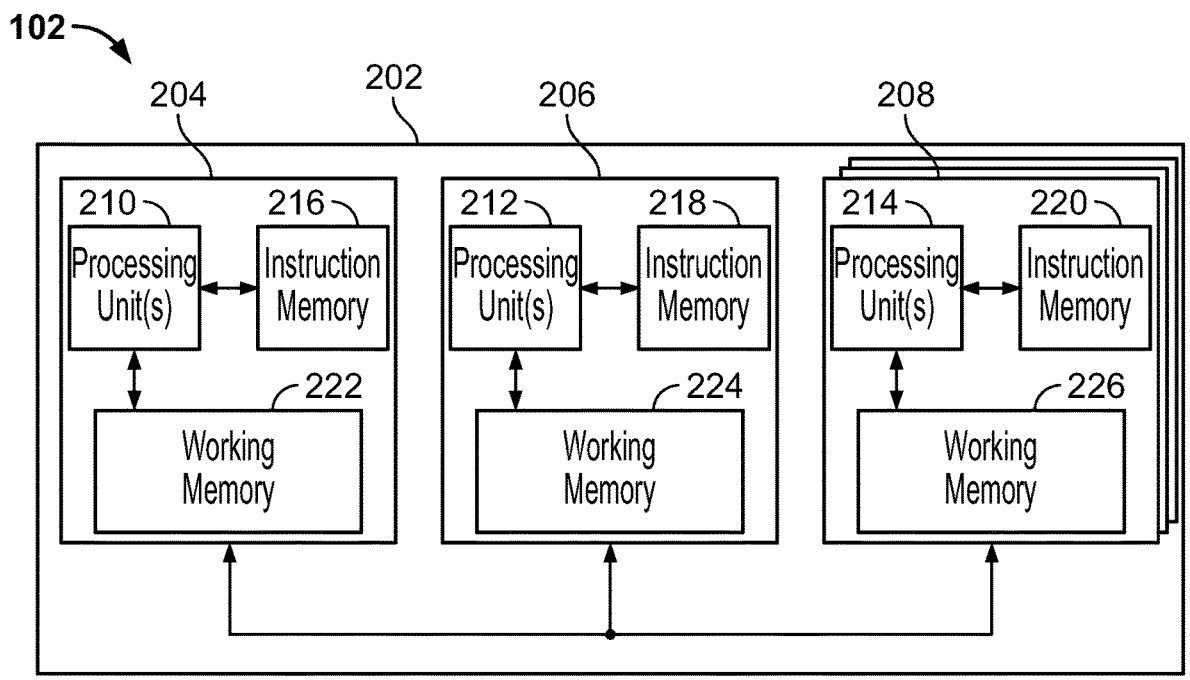
FIG. 2 is an illustration of an aircraft engine employing an engine control system in accordance with some embodiments.

FIG. 2 illustrates an engine control system 202 aircraft engine 102 of the example aircraft 100 of FIG. 1 in more detail. The engine control system 202 includes a control node 204, a concentrator node 206, and multiple electronic security modules (ESMs) 208. The control node 204 may be, for example, a FADEC. In some examples, one or more of ESMs 208 may be a hardware security module (HSM) or a trusted protection module (TSM). Each of the control node 204, concentrator node 206, and multiple ESMs 208 may include one or more processing units 210, 212, 214. A processing unit can be, for example, a processor, a microprocessor, an execution unit or "core" on a microprocessor chip, a digital signal processor (DSP), a soft or hard core within a field-programmable gate arrays (FPGA), a processor within an application-specific integrated circuit (ASIC), a general processing unit (GPU), a commercial off the shelf (COTS) processor, or any other suitable processor. For example, any one of ESM 208 may include a secure cryptoprocessor chip, or may use a combination of integrated circuits to make itself more tamper resistant. In addition to including any crypto-processors, ESM 208 may be certified to international standards and the designs may use different electronics, algorithms, and encryption techniques to provide a level of security for the ESM's memory.

ESM 208 may also include an instruction memory 220. Instruction memory 220 can store instructions that can be accessed (e.g., read) and executed by processing unit 214. For example, instruction memory 220 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. Instruction memory 220 may also store data and instructions that may not be executed by processing unit 214. For example, as described in more detail below, instruction memory 220 may store executable instructions (e.g., software images) that are configured to be loaded to one or both of control node 204 and concentrator node 206 by ESM 208.

Each of the control node 204, concentrator node 206, and ESM 208 may also include working memory 222, 224, 226, respectively. Processing units 210, 212, 214 can store data to, and read data from, working memory 222, 224, 226, respectively. For example, processing unit 214 of the ESM 208 can store a working set of instructions to working memory 226, such as instructions loaded from instruction memory 220. Processing units 210, 212, 214 can also use working memory 222, 224, 226, respectively, to store dynamic data.

ESM 208 may be commutatively coupled to control node 204 and concentrator node 206. Processing unit 214 of ESM 208 may be configured to provide instructions from instruction memory 220 to control node 204. For example, processing unit 214 may provide instructions from instruction memory 220 to working memory 222 of control node 204. Processing unit 210 may then execute the instructions from working memory 218.

Similarly, processing unit 214 may be configured to provide instructions from instruction memory 220 to concentrator node 206. For example, processing unit 214 may provide instructions from instruction memory 220 to working memory 224 of concentrator node 206. Processing unit 212 of concentrator node 206 may then execute the instructions from working memory 224. The instructions may be provided by processing unit 214 to control node 204 and concentrator node 206 as part of a power-up procedure, for example.

Figure 3:
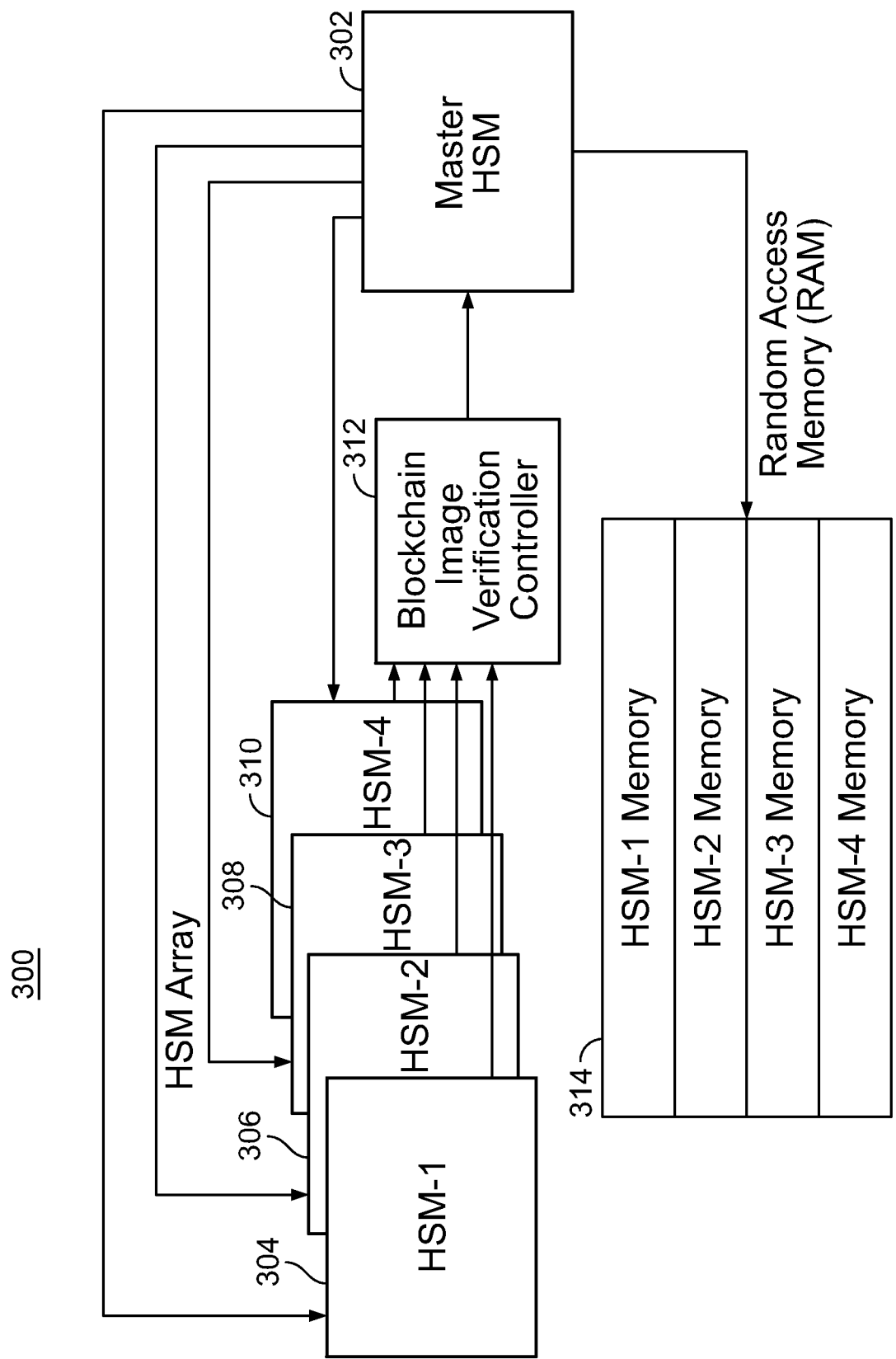
FIG. 3 is a block diagram of an engine control system in accordance with some embodiments.

FIG. 3 illustrates a block diagram of an engine control system 300 that includes a master hardware security module (HSM) 302 communicatively coupled to an HSM array that includes first HSM 304, second HSM 306, third HSM 308, and fourth HSM 310. Although in this example the HSM array includes four HSMs, in other examples the HSM array may include fewer, or more, HSMs. In some examples, one or more of master HSM 302, first HSM 304, second HSM 306, third HSM 308, or fourth HSM 310 may instead be a trusted protection module (TSM), or any other electronic security module (ESM). Master HSM 302 is also communicatively coupled to a random access memory (RAM) 314. For example, master HSM 302 may store data to, or read data from, RAM 314. Master HSM 302 is also communicatively coupled to blockchain image verification controller 312. Blockchain as used herein refers to a distributed ledger.

Master HSM 302 and each of first HSM 304, second HSM 306, third HSM 308, and fourth HSM 310 securely back up private keys that are used outside of the respective HSM for encryption purposes. These private keys may be backed up in wrapped form and stored on a computer disk or other media, or external to the system using a secure portable device like a smartcard or other security token.

In some examples, master HSM 302 obtains an executable software image such as a kernel image for an Operating System (OS) or an image for an Application Software (AS). For example, master HSM 302 may obtain the executable software image from a memory, such as an EEPROM or RAM device. In some examples, master HSM 302 clears the memory (e.g., deletes the executable software from the memory devices) after downloading the executable software image.

The executable software image is divided into sizes small enough capable of being stored in internal memories, such as working memory 226 or an EEPROM, of each of first HSM 304, second HSM 306, third HSM 308, and fourth HSM 310 of the HSM array. For example, a software size of the obtained software image may be greater than an internal memory size of any of first HSM 304, second HSM 306, third HSM 308, and fourth HSM 310 of the HSM array. As such, the software image is divided into portions that may be stored in at least two HSMs of the HSM array.

In some examples, master HSM 302 generates a control hash as a function of the software image (e.g., based on an entire software image). In some examples, master HSM 302 generates corresponding control hashes based on each respective portion of the divided software image. For example, master HSM 302 may generate a first control hash based on a first portion of the software image, a second control hash based on a second portion of the software image, a third control hash based on a third portion of the software image, and a fourth control hash based on a fourth portion of the software image. Master HSM 302 may store any control hash in, for example, a non-volatile memory, such as instruction memory 220.

In some examples, master HSM 302 may store any control hash, such as the control hash generated as a function of the software image or a control hash corresponding to a respective portion of a divided software image, in a distributed ledger, as discussed in more detail with respect to FIG. 6 below. In some examples, master HSM 302 may encrypt any generated control hash, such as with a private key. For example, master HSM 302 may encrypt one or more of the control hash generated as a function of the software image, the first control hash, the second control hash, the third control hash, or the fourth control hash. Each private key may be stored, for example, in non-volatile memory, such as in instruction memory 208.

To verify that the software image is secure, boot loading software can cause master HSM 302 to load each of the divided images sequentially into RAM 314 as the engine control system 300 powers up. As the engine control system 300 initializes, master HSM 302 relinks the divided images into a correct configuration of the software image (e.g., stores them in RAM 314 in consecutive memory locations and in proper order, or with proper jump instructions to a memory location holding the proper next portion of the software image) so that the engine control system 300 properly boots up.

In some examples, prior to a processing device, such as a processor or microprocessor, booting up from the software image located in RAM 314, each portion of the software image (e.g., each divided image), blockchain image verification controller 312 verifies each portion of the software image by, for example, obtaining each portion of the software image from each of first HSM 304, second HSM 306, third HSM 308, and fourth HSM 310 of the HSM array, and comparing each portion of the software image against a respective expected (e.g., correct) portion of the software image. For example, blockchain image verification controller 312 may employ a blockchain encryption method to verify each portion of the software image read back from each of first HSM 304, second HSM 306, third HSM 308, and fourth HSM 310 of the HSM array. Blockchain image verification controller 312 may compare a correct software image against the blockchain image from the unsecured system boot prior to the executable image being loaded into the RAM 314, thereby verifying each portion of the divided software image before any processor executes the software image in RAM 314.

For example, and referring to FIG. 3, master HSM 302 may transmit a first command to first HSM 304 to provide a first portion of a software image to blockchain image verification controller 312. Blockchain image verification controller 312 may obtain the first portion of the software image, and generate a first hash based on the first portion of the software image. Blockchain image verification controller 312 may provide a first signal to master HSM 302 identifying the first hash. Master HSM 302 may then transmit a second command to second HSM 306 to provide a second portion of the software image to blockchain image verification controller 312. Blockchain image verification controller 312 may obtain the second portion of the software image, and generate a second hash based on the second portion of the software image. Blockchain image verification controller 312 may provide a second signal to master HSM 302 identifying the second hash.

Similarly, master HSM 302 may transmit a third command to third HSM 308 to provide a third portion of the software image to blockchain image verification controller 312. Blockchain image verification controller 312 may obtain the third portion of the software image, and generate a third hash based on the third portion of the software image. Blockchain image verification controller 312 may provide a third signal to master HSM 302 identifying the third hash. Master HSM 302 may also transmit a fourth command to fourth HSM 310 to provide a fourth portion of the software image to blockchain image verification controller 312. Blockchain image verification controller 312 may obtain the fourth portion of the software image, and generate a fourth hash based on the fourth portion of the software image.

Blockchain image verification controller 312 may then provide a fourth signal to master HSM 302 identifying the fourth hash.

In some examples, blockchain image verification controller 312 may generate a subsequent hash based on a portion of the software image and a preceding hash. For example, blockchain image verification controller 312 may generate the second hash based on the second portion of the software image and the first hash. Similarly, blockchain image verification controller 312 may generate the third hash based on the third portion of the software image and the third hash. Blockchain image verification controller 312 may also generate the third hash based on the third portion of the software image and the second hash.

In some examples, master HSM 302 may verify each portion of the software image by comparing a received hash with a control hash. For example, master HSM 302 may verify the first portion of the software image by comparing the first hash received from blockchain image verification controller 312 to the first control hash. If the comparison is successful, master HSM 312 may proceed to transmit the second command to second HSM 306 to provide the second portion of the software image to blockchain image verification controller 312. Otherwise, if the comparison is not successful, master HSM 312 may flag the first portion of the software image. For example, master HSM 312 may provide an error signal. The error signal may cause a display to indicate the error, for example, or may cause an LED to be powered, thereby providing a visual indication of the error. Master HSM 312 may execute similar processing steps to verify the second, third, and fourth portions of the software image.

In some examples, master HSM 312 verifies the software image by comparing a final hash for a final portion of the software image, which may be based on the final portion of the software image and the hashes for the previous portions of the software image, to a control hash generated as function of the software image. For example, master HSM 312 may verify the software image by comparing the fourth hash, which may be based on the fourth portion of the software image and the first hash, second hash, and third hash, to the control hash generated as function of the software image.

In some examples, prior to comparing control hashes, master HSM 312 may unencrypt an encrypted control hash. For example, if first control hash was encrypted, master HSM 312 may obtain the encrypted first control hash from memory and unencrypt it with, for example, a private key. Similarly, if second control hash was encrypted, master HSM 312 may obtain the encrypted second control hash from memory and unencrypt it with a private key. If third control hash was encrypted, master HSM 312 may obtain the encrypted third control hash from memory and unencrypt it with a private key, and if fourth control hash was encrypted, master HSM 312 may obtain the encrypted fourth control hash from memory and unencrypt it with a private key.

Figure 4:
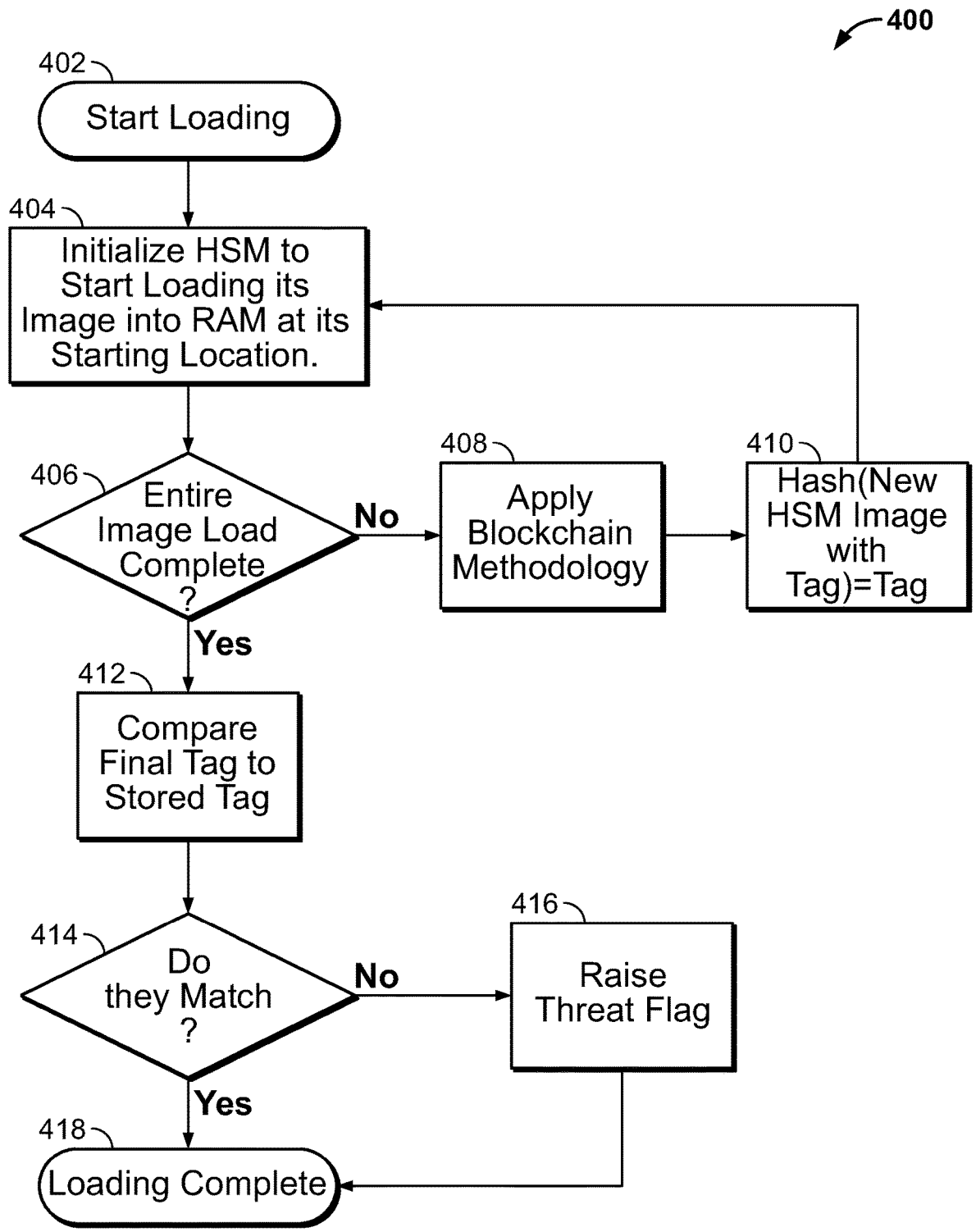
FIG. 4 is a flowchart of an example method that can be carried out by the engine control system of FIG. 2 in accordance with some embodiments.

FIG. 4 is a flowchart of an example secured load method 400 that can be carried out by, for example, the engine control system 202 of FIG. 2. Although the methods are described with reference to illustrated flowcharts, it will be appreciated that many other ways of performing the acts associated with the methods may be used. For example, the order of some operations may be changed, and some of the operations described may be optional.

Turning to the secured load method 400, the method begins at step 402 where the loading of a software image begins. At step 404, a first HSM of an HSM array, such as first HSM 304, is initialized to start loading a portion of an executable image, such as a first portion of a software image, into RAM at a starting location, such as a location in RAM 314 (e.g., a location from which a processor will begin executing from). For example, master HSM 302 may initialize first HSM 304 to begin loading a first portion of the software image into RAM 314. At step 406, a determination is made as to whether the entire executable image has been loaded into RAM. If the entire software image has not been loaded into RAM, the method proceeds to step 408, where a blockchain methodology is applied to the portion of the executable image loaded into RAM. For example, master HSM 302 may generate blockchain data based on the downloaded portion of the executable image, such that the blockchain data may be stored in a distributed ledger.

The method then proceeds to step 410, where a hash is generated based on the blockchain data. For example, master HSM 302 may generate the hash tag based on the blockchain data. The method then proceeds back to step 404, where another HSM of the HSM array, such as second HSM 306, is initialized to start loading another portion of the executable image. The same hash tag is updated at step 410 every time step 410 is executed.

Back at step 406, if the executable image has been entirely loaded into RAM, the method proceeds to step 412. At this point, the last hashtag generated at step 410 is the final hashtag. At step 412, the final hash tag, last updated at step 410, is compared to a stored hash tag. The stored hash tag may be stored, for example, in non-volatile memory. For example, master HSM 302 may obtain the stored hash tag from non-volatile memory, and compare it to the final hash tag. Proceeding to step 414, a determination is made as to whether the last hashtag generated and the stored hash tag match. If the hashtags match, the method proceeds to step 418, where loading of the executable image is complete (e.g., successfully completed). Otherwise, if the hashtags do not match, the method proceeds to step 416, where a threat flag is raised. For example, generation of the threat flag may cause a display to show an error, for an error LED to be powered on, or for a message, such as an SMS or EMAIL message, to be transmitted, where the message identifies the error. The message then proceeds to step 418 where loading is complete (e.g., unsuccessfully completed).

Figure 5:
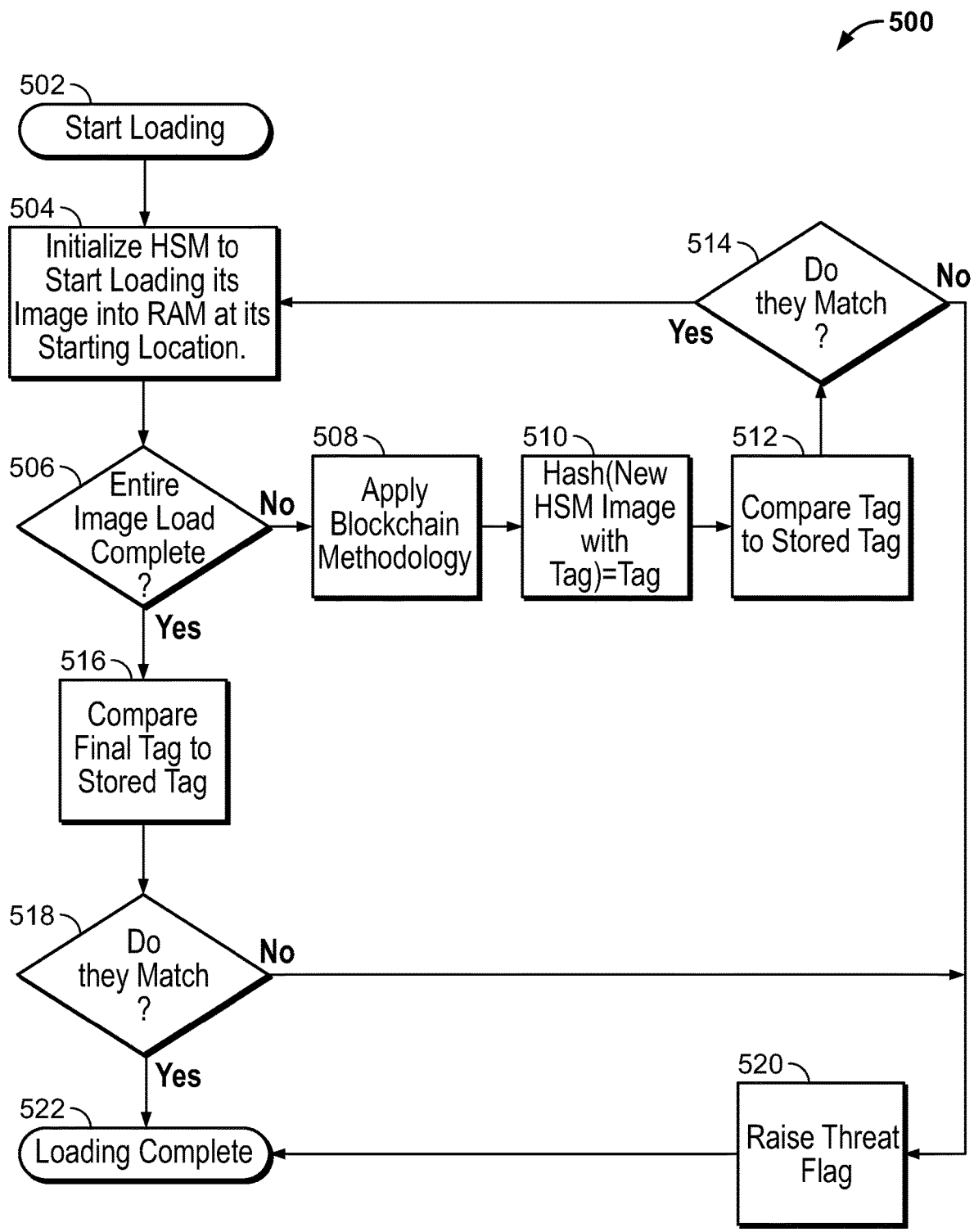
FIG. 5 is a flowchart of another example method that can be carried out by the engine control system of FIG. 2 in accordance with some embodiments.

FIG. 5 is a flowchart of an example secured load method 500 that can be carried out by, for example, the engine control system 202 of FIG. 2. The method begins at step 502 where the loading of a software image begins. At step 504, a first HSM of an HSM array, such as first HSM 304, is initialized to start loading a portion of an executable image, such as a first portion of a software image, into RAM at a starting location, such as a location in RAM 314 (e.g., a location from which a processor will begin executing from). For example, master HSM 302 may initialize first HSM 304 to begin loading a first portion of the software image into RAM 314. At step 506, a determination is made as to whether the entire executable image has been loaded into RAM. If the entire software image has not been loaded into RAM, the method proceeds to step 508, where a blockchain methodology is applied to the portion of the executable image loaded into RAM. For example, master HSM 302 may generate blockchain data based on the downloaded portion of the executable image, such that the blockchain data may be stored in a distributed ledger.

The method then proceeds to step 510, where a hash is generated based on the blockchain data. For example, master HSM 302 may generate the hash tag based on the blockchain data. The method then proceeds to step 512, where the hash tag generated at step 510 is compared to a corresponding stored hash tag. For example, the stored hash tag may correspond to a respective portion of the executable image for which the generated hashtag was computed. The stored hash tag may be obtained, for example, from non-volatile memory. For example, master HSM 302 may obtain the stored hash tag from non-volatile memory, and compare it to the generated hash tag.

Proceeding to step 514, a determination is made as to whether, based on the comparison, the hashtag generated at step 510 matches the stored hash tag match. If the hashtags match, the method proceeds back to step 504, where another HSM of the HSM array, such as second HSM 306, is initialized to start loading another portion of the executable image. Otherwise, if the hashtags do not match, the method proceeds to step 520, where a threat flag is raised. For example, generation of the threat flag may cause a display to show an error, for an error LED to be powered on, or for a message, such as an SMS or EMAIL message, to be transmitted, where the message identifies the error. The method then proceeds to step 522, where loading is complete (e.g., unsuccessfully complete).

Back at step 506, if the executable image has been entirely loaded into RAM, the method proceeds to step 516. At this point, the last hashtag generated at step 510 is the final hashtag. At step 516, the final hash tag, last updated at step 510, is compared to a stored hash tag. The stored hash tag may be stored, for example, in non-volatile memory. For example, master HSM 302 may obtain the stored hash tag from non-volatile memory, and compare it to the final hash tag. Proceeding to step 518, a determination is made as to whether the last hashtag generated and the stored hash tag match. If the hashtags match, the method proceeds to step 522, where loading of the executable image is complete (e.g., successfully completed). Otherwise, if the hashtags do not match, the method proceeds to step 520, where a threat flag is raised. The message then proceeds to step 522 where loading is complete (e.g., unsuccessfully completed).

Figure 6:
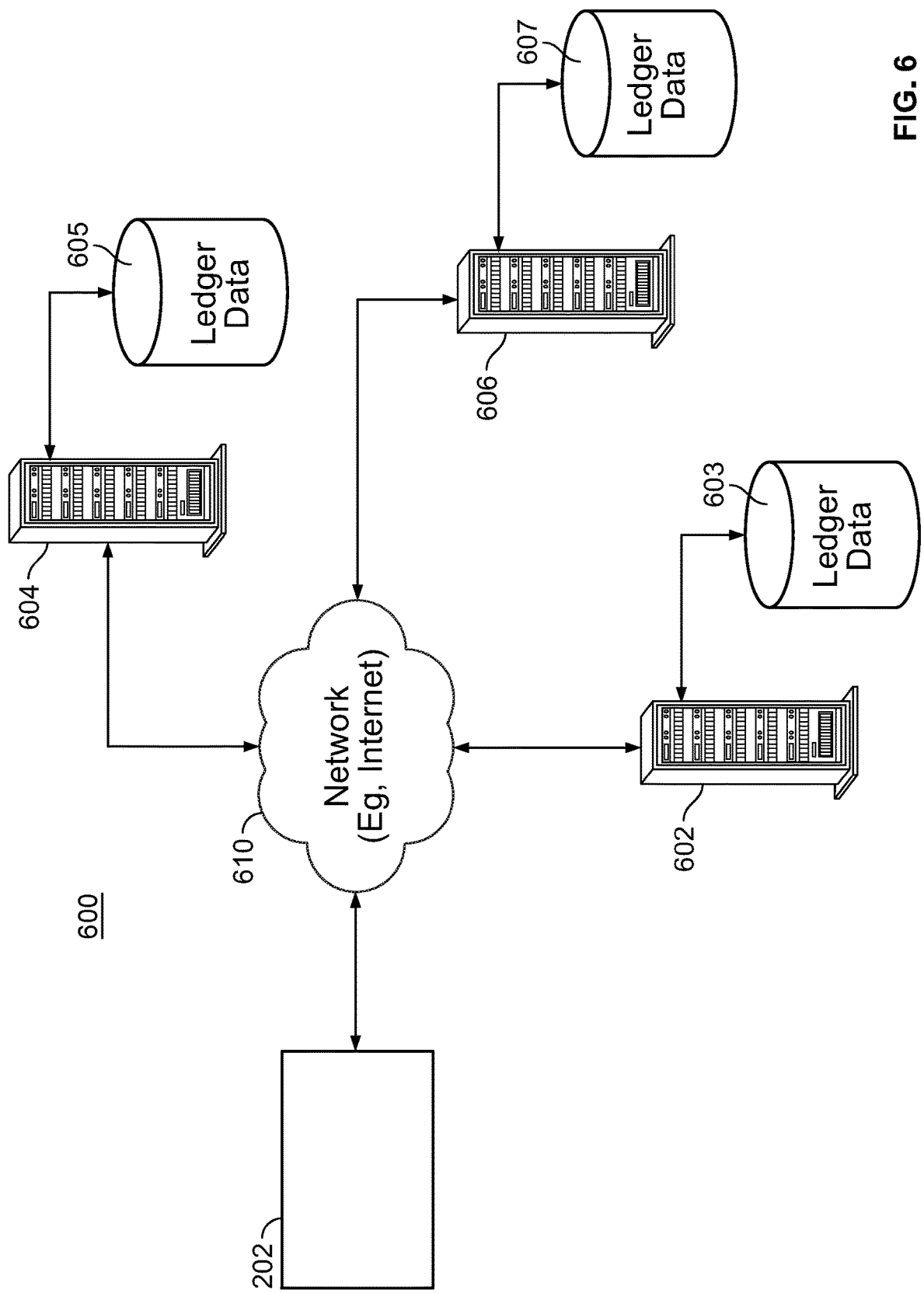
FIG. 6 is an illustration of the engine control system of FIG. 2 operating within a distributed ledger network.

FIG. 6 is an illustration of the engine control system 202 of FIG. 2 operating within a distributed ledger network 600. Distributed ledger network 600 may support a distributed ledger, such as a blockchain. A distributed ledger is a cryptographically secure ledger containing many different transactions. The transactions may be grouped into blocks, and the blocks may be linked (i.e., chained) together with cryptographic algorithms to form a blockchain. Moreover, the blockchains may be stored on blockchain ledgers residing in memory of several computing devices. For example, the same transactions may be stored in blockchains of blockchain ledgers residing in memory of a plurality of computing devices. One advantage of the blockchain is its integrity. The ability to revise blocks to add, modify, or remove transactions after successive transactions becomes intractable (i.e., substantially impossible).

In this example, engine control system 202 is communicatively coupled to distributed ledger servers 602, 604, 606 via network 610. Engine control system 202 and distributed ledger servers 602, 604, 606 may all be operable to post distributed ledger data to, and read distributed ledger data from, the same distributed ledger supported by distributed ledger network 600.

Network 610 may be any suitable network. For example, network 610 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Network 610 can provide access to, for example, the Internet.

Each of distributed ledger servers 602, 604, 606 is operable to store data to, and read data from, a corresponding blockchain ledger data database 603, 605, 607. For example, distributed ledger 602 may store blockchain ledger data to blockchain ledger database 603. Similarly, distributed ledger 604 may store blockchain ledger data to blockchain ledger database 605, and distributed ledger 606 may store blockchain ledger data to blockchain ledger database 607.

In some examples, the blockchain ledger data may identify and characterize a control hash. For example, engine control system 202 may generate a control hash, and post the control hash to the distributed ledger supported by distributed ledger network 600. To post the control hash, engine control system 202 may transmit a message, received by distributed ledger servers 602, 604, 606, to post the control hash as a "transaction" on the distributed ledger. Engine control system 202 may also "verify" a transaction, such as the posting of a control hash to the distributed ledger.

Although examples are illustrated and described herein, embodiments are nevertheless not limited to the details shown, since various modifications and structural changes may be made therein by those of ordinary skill within the scope and range of equivalents of the claims.

What is claimed is:

1. A method for securely loading software in a power control system, comprising:
   dividing the software into n images;
   generating n control hashes, each control hash a function of the $n^{th}$ image and a hash of the n−1 image;
   recording the n control hashes in a distributed ledger;
   storing each of the n images in a corresponding n security modules;
   loading an i−1 image of the n images from an i−1 security module of the n security modules into a random access memory (RAM) of the power control system, where i is less than or equal to n;
   loading an $i^{th}$ image of the n images from an $i^{th}$ security module into the RAM of the power control system;
   generating an $i^{th}$ hash as a function of the $i^{th}$ stored image in the $i^{th}$ security module and a hash of the n−1 image stored in the i−1 security module;
   comparing the $i^{th}$ hash to the $i^{th}$ control hash; and
   flagging the $i^{th}$ image stored in the $i^{th}$ security module based upon the comparison.

2. The method of claim 1, wherein any of the n security modules is a hardware security module.

3. The method of claim 1, wherein any of the n security modules is a trusted protection module.

4. The method of claim 1, wherein the generating n control hashes further comprises encrypting each of the n control hashes.

5. The method of claim 4, wherein the comparing the $i^{th}$ hash to the $i^{th}$ control hash comprises decrypting the encrypted $i^{th}$ control hash.

6. The method of claim 4, wherein the comparing the $i^{th}$ hash to the $i^{th}$ control hash comprises encrypting the $i^{th}$ hash.

7. The method of claim 1, wherein a software size of the software is greater than a memory size of any of the n security modules.

8. The method of claim 1, wherein the software is an operating system or application.

9. The method of claim 1, wherein the dividing step comprises downloading from the power control system's RAM sequential images representing the software and clearing the RAM.

10. A method for securely loading software into secured memory via multiple security modules, comprising:
dividing the software into n images;
generating n control hashes, each control hash a function of the $n^{th}$ image and the n−1 image;
recording each of the n control hashes in a distributed ledger;
storing each of the n images in a corresponding n security modules;
loading a corresponding image of the n images from an $i^{th}$ security module of the n security modules into the secured memory, where i is less than or equal to n;
generating an $i^{th}$ hash as a function of the $i^{th}$ image stored in the $i^{th}$ security module and the i−1 image stored in the i−1 security module;
comparing the $i^{th}$ hash to the corresponding $i^{th}$ one of the corresponding n control hashes; and
executing the loaded software from the secured memory based upon the comparison.

11. The method of claim 10, wherein the $i^{th}$ stored image is the $n^{th}$ stored image.

12. The method of claim 10, wherein the dividing step comprises downloading, from a random access memory (RAM), sequential images representing the software and clearing the RAM.

13. A non-transitory, computer-readable storage medium comprising executable instructions that, when executed by one or more processors, cause the one or more processors to:
divide a software image into n images;
generate n control hashes, each control hash a function of the $n^{th}$ image and the n−1 image;
record each of the n control hashes;
store each of the n images in a corresponding n security modules;
load the corresponding image of the n images from an $i^{th}$ security module of the n security modules into secured memory, where i is less than or equal to n;
generate an $i^{th}$ hash as a function of the $i^{th}$ image stored in the $i^{th}$ security module and the i−1 image stored in the i−1 security module;
compare the $i^{th}$ hash to the corresponding $i^{th}$ one of the corresponding n control hashes; and
execute the loaded software from the secured memory based upon the comparison.

14. The computer-readable storage medium of claim 13, wherein the executable instructions, when executed by the one or more processors, cause the one or more processors to:
download, from a random access memory (RAM), sequential images representing the software image; and
clear the RAM.

15. The computer-readable storage medium of claim 13, wherein the executable instructions, when executed by the one or more processors, cause the one or more processors to record the n control hashes in a distributed ledger.

* * * * *